(12) United States Patent
Allen

(10) Patent No.: US 11,307,417 B2
(45) Date of Patent: Apr. 19, 2022

(54) PANEL TO ATTENUATE LIGHT FOR ELECTRONIC EYEWEAR DEVICE

(71) Applicant: Hewlett-Packard Development Company, L.P., Spring, TX (US)

(72) Inventor: Will Allen, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 171 days.

(21) Appl. No.: 16/629,977

(22) PCT Filed: Jul. 14, 2017

(86) PCT No.: PCT/US2017/042158
§ 371 (c)(1),
(2) Date: Jan. 10, 2020

(87) PCT Pub. No.: WO2019/013821
PCT Pub. Date: Jan. 17, 2019

(65) Prior Publication Data
US 2020/0159021 A1    May 21, 2020

(51) Int. Cl.
*G02B 27/01* (2006.01)
*G02F 1/15* (2019.01)

(52) U.S. Cl.
CPC ..... *G02B 27/0172* (2013.01); *G02B 27/0176* (2013.01); *G02B 2027/0118* (2013.01); *G02B 2027/0154* (2013.01); *G02B 2027/0178* (2013.01); *G02F 1/15* (2013.01)

(58) Field of Classification Search
CPC .............. G02B 27/0172; G02B 27/017; G02B 27/0176; G02B 27/01; G02B 2027/0118; G02B 2027/0154; G02B 2027/0178; G02F 1/15

USPC .......................................................... 359/265
See application file for complete search history.

(56) References Cited

U.S. PATENT DOCUMENTS

| | | | |
|---|---|---|---|
| 7,264,350 | B2 | 9/2007 | Jannard et al. |
| 8,537,075 | B2 | 9/2013 | Crocco et al. |
| 9,286,730 | B2 | 3/2016 | Bar-Zeev et al. |
| 9,442,293 | B2 | 9/2016 | Alton et al. |
| 2015/0205106 | A1 | 7/2015 | Norden |
| 2015/0363978 | A1 | 12/2015 | Maimone et al. |
| 2015/0370071 | A1 | 12/2015 | Alton et al. |
| 2016/0247319 | A1 | 8/2016 | Nowatzyk et al. |

FOREIGN PATENT DOCUMENTS

| | | |
|---|---|---|
| RU | 2010100613 C2 | 7/2011 |
| WO | WO-1999023524 A1 | 5/1999 |

OTHER PUBLICATIONS

Hwang, Alex D., et al. "An augmented-reality edge enhancement application for Google Glass." Optometry and vision science: official publication of the American Academy of Optometry 91, No. 8 (2014): 1021.

*Primary Examiner* — William R Alexander
(74) *Attorney, Agent, or Firm* — Fabian VanCott

(57) ABSTRACT

An electronic eyewear device includes a structure, a display assembly and a panel. The structure includes a frame that defines a display lens area and a free lens area, where the structure is wearable to position the display lens area across from a first eye of a user and the free lens area across from a second eye of the user. The display assembly includes a display surface provided in the display lens area. The panel attenuates light provided in the free lens area.

20 Claims, 4 Drawing Sheets

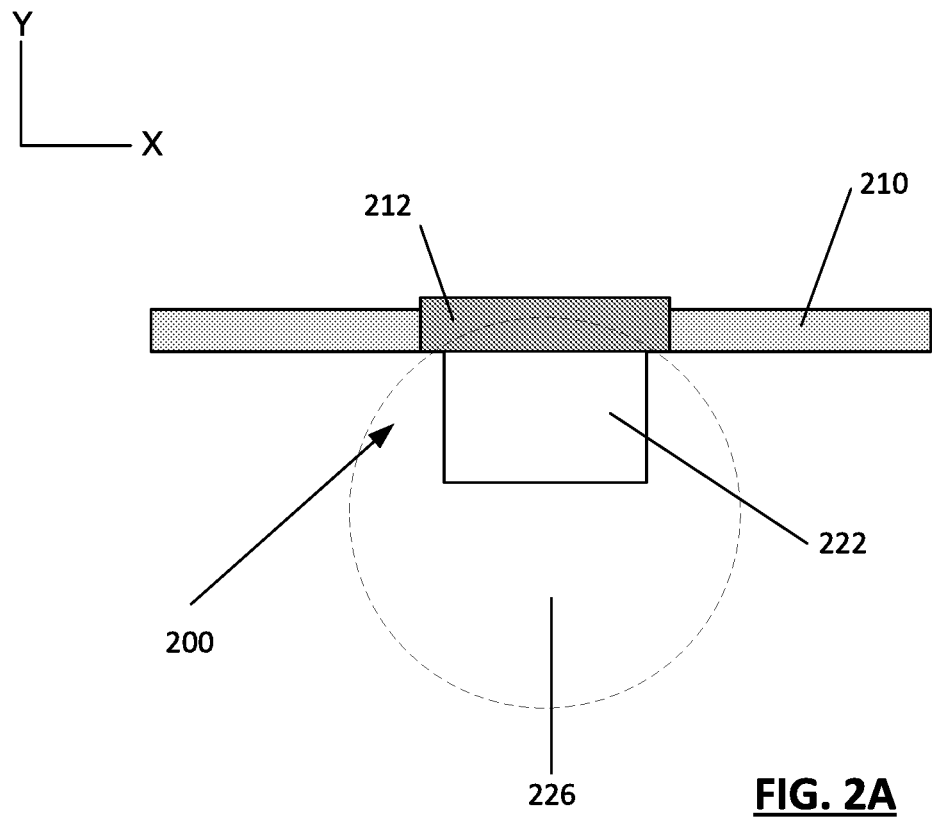
FIG. 2A
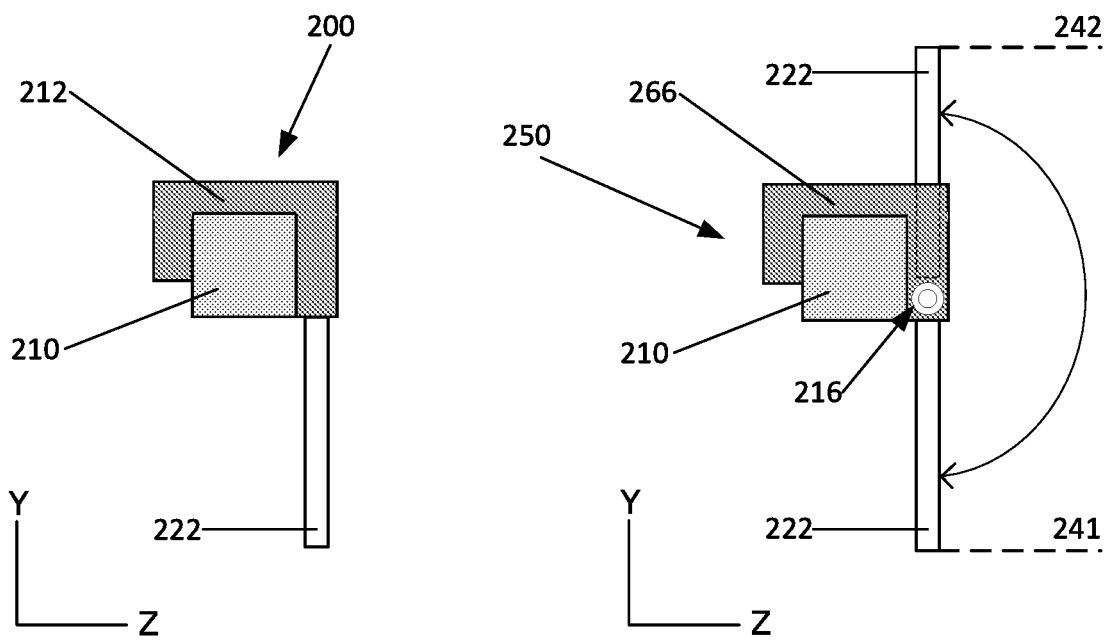
FIG. 2B  FIG. 2C

PANEL TO ATTENUATE LIGHT FOR ELECTRONIC EYEWEAR DEVICE

BACKGROUND

Electronic eyewear devices are a type of wearable electronic device which generate electronic content near the eye of the user. For example, some electronic eyewear devices use an interior surface of a lens near the eye to reflect an image from a small projector.

BRIEF DESCRIPTION OF THE DRAWINGS

FIG. 2A illustrates a front view of an example accessory device for an electronic eyewear device.

FIG. 2B illustrates a side view of an accessory device of FIG. 2A.

FIG. 2C illustrates a side view of an example accessory device having a physically manipulatable panel.

DETAILED DESCRIPTION

Figure 1:
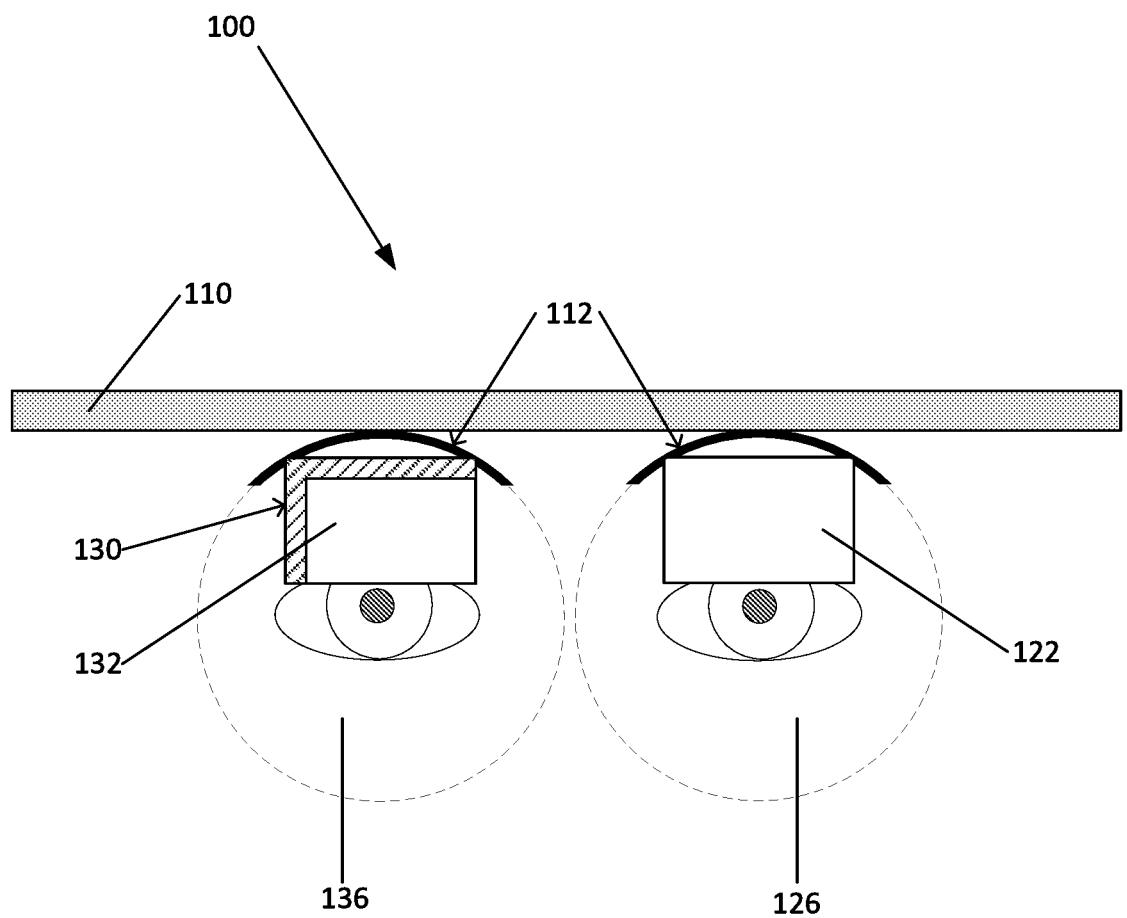
FIG. 1 illustrates an example electronic eyewear device.

Examples are described for an electronic eyewear device that enhances a visual quality of an output rendered by the electronic eyewear device while simultaneously viewing a surrounding environment. In some examples, an electronic eyewear device is provided which includes a panel positioned over or near a free lens area, to enhance the user's experience when viewing content generated on or near the other lens area of the eyewear device. As described with various examples, the panel can be structured and positioned to attenuate light for one of the user's eyes, while a display surface is provided near the other eye of the user. Among other benefits, the presence of the panel prevents the user from perceiving the surrounding environment at the same time as the content rendered on the display surface. According to some examples, the electronic eyewear device includes a structure, a display assembly and a panel. The structure includes a frame that defines a display lens area and a free lens area. The structure is wearable to position the display lens area across from a first eye of a user while a free lens area is positioned across from a second eye of the user. A panel is provided near the free lens area to attenuate light for a user.

Some examples described herein can generally require the use of computing devices, including processing and memory resources. For example, one or more examples described herein may be implemented, in whole or in part, on computing devices such as servers, desktop computers, cellular or smartphones, and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples described herein can be carried and/or executed. In particular, the numerous machines shown with examples described herein include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

FIG. 1 illustrates an example electronic eyewear device. A structure 110, as shown in FIG. 1, may correspond to any wearable ophthalmic structure that supports and/or positions a lens or lens area on or about the head of a user. For example, the structure 110 may provide ear, temple and/or nose support among other types of support.

With reference to the example of FIG. 1, the structure 110 includes a frame 112 to hold lenses of an eyewear device. Alternatively, the frame 112 may define respective areas (shown as display lens area 136 and free lens area 126) where lenses may be received and retained. The structure 110 may be wearable to position the display lens area 136 across from a first eye of a user, and the free lens area 126 across from a second eye of a user.

Display lens area 136 can include a display assembly 130 and a display surface 132. Display assembly 130 and display surface 132 may correspond to, for example, components of an optical head-mounted display that project an output onto a display surface where the output overlays and/or augments a user's surrounding environment. The display assembly 130 can include electronic components, such as a processor, memory, power source, integrated circuitry and other resources to enable use of the electronic eyewear device 100. Further, the display assembly 130 can include optical components to enable various techniques (e.g. "curved mirror" technique, "waveguide" technique, etc.) for the display of an output on a display surface of the electronic eyewear device 100. The optical components can include, for example, components for diffraction optics, holographic optics, polarized optics, and reflective optics, among others.

The output generated and displayed can include, for example, any form of digital media, such as digital imagery, digital video, video games, web pages, e-books, graphics, satellite navigation data, etc. In addition, the output can be interactive or can be digitally manipulatable in relation to a user's surrounding environment.

With reference to the example of FIG. 1, the display assembly 130 can display an output on a display surface 132 that is provided with a lens, retained in the lens area 136. The structure 110 can also provide, or enable attachment of a panel 122 across from the second eye of the user in the free lens area 126. Once in use, the panel 122 can attenuate light for the user's eye, positioned near the free lens area 126.

The panel 122 can be formed of material with a static or fixed opacity, such as plastic, wood, metal, cloth, or even opaque glass. In variations, the panel 122 can include electrochromic material that is responsive to an input signal, which may be received from a user or as a sensor response to an environmental condition. In an implementation in which the panel 122 is formed from plastic, for example, the opacity of the panel 122 may be static and unresponsive to an input signal. In other examples, where the panel 122 is formed from an electrochromic material (e.g., "smart glass"), the panel 122 may be responsive to an electrical input such that the panel 122 is transparent when no electrical signal is present and opaque when an electrical signal is applied.

In some examples, the structure 110 can include electronic components to enable the operation of the responsive features of the panel 122. For example, the electronic components can allow the user to signal input (e.g., with actuation of button or other interface feature) that causes an electrical signal to actuate the electrochromic material of the electronic eyewear device. With actuation, the electrochromic material switches to an opaque state. By way of example, the electronic components can include a circuit device powered by a battery or solar cell. In some variations, the circuit device includes a sensor to indicate when, for example, the eyewear device is exposed to light, and/or when the user is wearing the eyewear device.

In some variations, the panel 122 can be fixed relative to the frame of the structure 110 (e.g., see FIG. 1, FIGS. 2A-B, FIG. 3). Alternatively, the panel can be coupled to the frame 112 or other structure 110 of the eyewear device, in a manner that enables the panel to be physically manipulatable with respect to orientation and placement relative to the eye of the user (e.g., see FIG. 2C and FIGS. 4A-B). For example, the panel 122 can be manipulatable into and out of the free lens area 126 by a variety of coupling mechanisms, such as by a jointed assembly, hinge mechanism, or slider (e.g., snap-to-fit coupling). In some examples, the panel 122 can be removeablely coupled to the structure 110 using a coupling mechanism. For example, the user may couple the panel 122 to the structure 110 when the display of the device is active or in use.

In some examples, both an interior façade of the panel 122 (i.e., façade that directly opposes the second eye of the user) and an exterior façade of the panel 122 are opaque to enable the panel 122 to attenuate light in the free lens area 126. In variations, the interior façade of the panel 122 may be opaque, while the exterior façade of the panel 122 is provided an alternative appearance, such as a visual design that is personalized to the user. For example, the interior façade of the panel 122 may include a portion of black plastic, but the exterior façade of the panel 122 may be graphically designed to disguise the presence of the panel 122, or to provide an aesthetic and personalized decor.

FIGS. 2A through 2C illustrate an example accessory device to attenuate light for an electronic eyewear device. As shown, an accessory device 200 can include a panel 222 to attenuate light, and a coupling mechanism 212 to attach the panel 222 to the frame or structure of an eyewear device. The panel 222 can be formed numerous suitable materials, such as plastic, cloth, glass, metal etc. In variations, the panel 122 can be formed from electrochromatic material, such that the material can change opacity with the application of an electrical signal. In some examples, both an interior façade of the panel 222 (i.e., façade that directly opposes the second eye of the user) and an exterior façade of the panel 222 are opaque to enable the panel 222 to attenuate light in the free lens area 226. In other examples, the interior façade of the panel 222 is opaque, and the exterior façade of the panel 222 is non-opaque. For example, the exterior façade may a visual design that is different from the interior façade of the panel 222.

FIG. 2A illustrates a front view of the accessory device relative to a lens area of an electronic eyewear device. As shown, the coupling mechanism 212 couples the panel 222 to the structure 210, such that the panel 222 is positioned in a free lens area 226 of the structure 210. The coupling mechanism 212 can be structured to enable attachment and detachment of the panel 222 with respect to the structure 210. By way of example, the coupling mechanism 212 can correspond to a snap-on or clamping mechanisms that snaps onto a suitably shaped portion of the structure 210. As another example, the coupling mechanism 212 can be implemented using a magnetic coupling, where magnetic material provided with the structure 210 and the panel 222 enable affixing the panel 222 in position near the lens area.

FIG. 2B is a side view (looking down the X axes) of the accessory device 200. As shown, the coupling mechanism 212 can attach and detach the panel 222 from the structure 210. When attached, the panel 222 is maintained in a fixed position and orientation. While some examples provide for the coupling mechanism 212 to maintain the panel 222 in a fixed position, variations may alternatively provide for the coupling mechanism 212 to enable the panel 222 to be attached to the structure 210, and physically manipulatable in position and/or orientation about the structure. For example, the coupling mechanism 212 may enable the panel 222 to move laterally, or to pivot about the structure 210.

FIG. 2C illustrates an accessory device for an electronic eyewear device, in which the panel to attenuate light can be manipulated into alternative positions and orientations. As shown, an accessory device 250 includes a coupling mechanism 266 that couples the panel 222 to the structure 210. The coupling mechanism 266 may, for example, retain the panel 222 using a snap-in connection. In an example shown, the coupling mechanism 266 includes a pivot point 268, which pivotally secures the coupling mechanism 266 to the structure. The pivot point 268 enables the panel 222 to pivot into multiple orientations relative to an X-axis (corresponding to length of structure 210 in FIG. 2C). For example, as shown in FIG. 2C, the panel 222 may be positioned in an engaged position 241, closest to the user's eye. From the engaged position 241, the panel 222 may swing upward to a distal position 242. The option to physically manipulate the panel 222 with respect to orientation and/or positioning allows the user to position the panel 222 outside of the lens area 226 when, for example, the user's surrounding environment does not detract from use of the electronic eyewear device 200.

Figure 3:
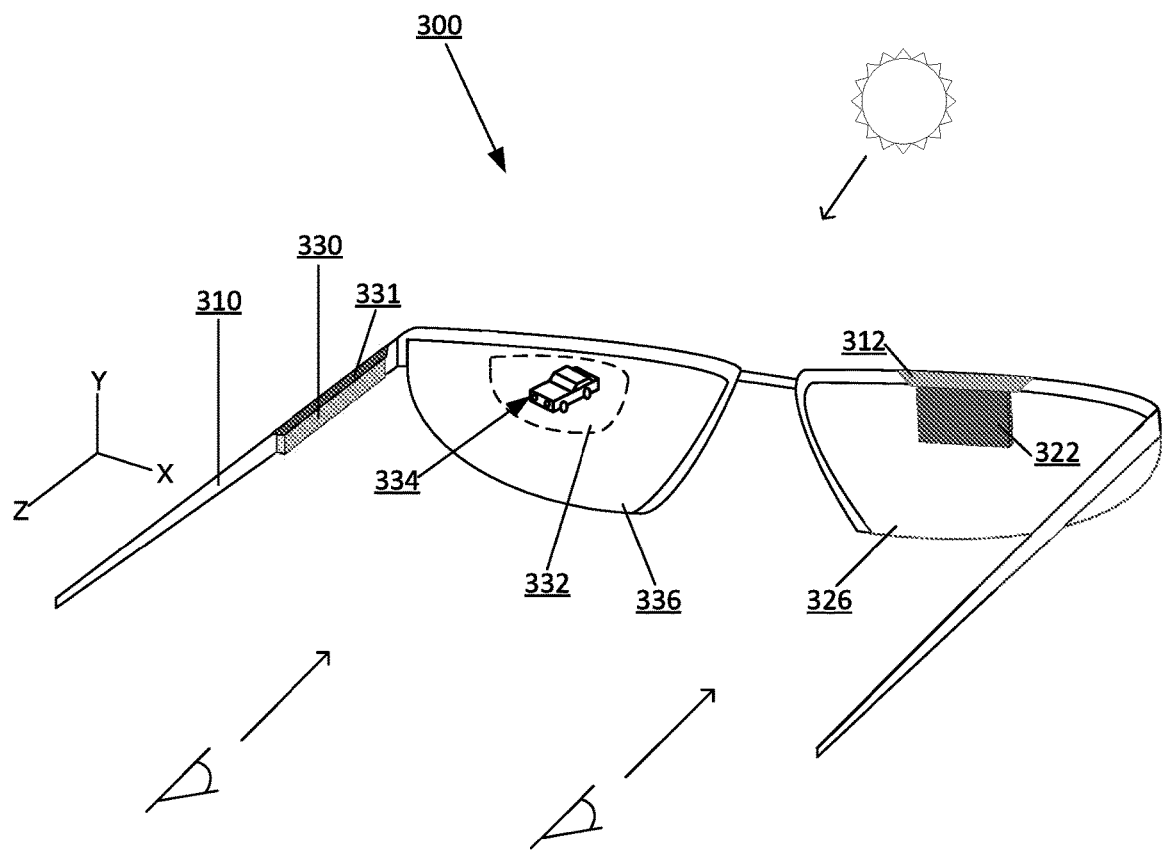
FIG. 3 illustrates an example electronic eyewear assembly.

FIG. 3 illustrates an example electronic eyewear assembly that includes a panel to attenuate light during use. An electronic eyewear assembly 300 can include an eyewear device 310, a display component 330, and a panel 322. The eyewear device 310 can include, for example, a glass or hard plastic lens mounted in a frame that is wearable to position the lenses across from the eyes of a user. According to the example of FIG. 3, the eyewear device 310 includes a first lens 336 and a second lens 326. The lenses can include prescription or non-prescription lenses, for example.

The display component 330 is coupled to the eyewear device 310 to generate display content 334 on a display surface 332 formed or otherwise provided with the first lens 336. The display component 330 may correspond to, for example, a mini-projector mounted to a temple extension of the structure. In such an example, the mini-projector may be positioned to project an output onto the display surface 332, where the display surface 332 is integrated with the first lens 336. The display component 330 can include a processing resource, a memory resource, a power source, circuitry and other resources to enable use of the electronic eyewear assembly 300.

In variations, the display component 330 can include optical components to enable various techniques (e.g. "curved mirror" technique, "waveguide" technique, etc.) for the display of an output on a display surface of the electronic eyewear assembly 300. Further, the optical components can include components for diffraction optics, holographic optics, polarized optics, and reflective optics, among others. The display component 330 may couple to the electronic eyewear device via a display component coupling mechanism 331.

The display surface 332 can be attached to or separate from the display component 330. In an example of FIG. 3, the display surface 332 is separate from the display component 330. The display component 330 generates display content 334 and projects the display content 334 onto the display surface 332, which is integrated with an interior surface of the first lens 336.

Examples of display content 334 can include any form of digital media, such as digital imagery, digital video, video games, web pages, e-books, graphics, GPS data, etc. In addition, the display content 334 can be interactive or can be digitally manipulatable in relation to a user's surrounding environment (i.e., augmented reality). In the example of FIG. 3, the display content 334 is a digital image of a car, which can be overlaid or superimposed on a surrounding environment of the user.

In further reference to FIG. 3, the electronic eyewear assembly includes a panel 322 coupled to the eyewear device 310 to attenuate light that would otherwise be perceived by the user's eye.

The panel 322 shown in FIG. 3, may include features such as described with examples of FIG. 1 and FIGS. 2A through 2C. As such, the panel 322 may be formed of suitable material (e.g., metal, plastic, glass, etc.) to attenuate light. For example, the material may include an opacity suitable to attenuate light. In variations, the panel 322 can be formed electrochromatic material that increases its opacity in response to an input signal.

In some examples, both an interior façade of the panel 322 (i.e., façade that directly opposes the second eye of the user) and an exterior façade of the panel 322 are opaque to enable the panel 322 to attenuate light in the area of the first lens 336. In other examples, only the interior façade of the panel 322 is opaque, where the exterior façade of the panel 322 may be transparent and include a visual design that is different from the interior façade of the panel 322. For example, the interior façade of the panel 322 may include a portion of black plastic, but the exterior façade of the panel 322 may be graphically designed to include a more aesthetic appearance than the interior façade.

In further reference to FIG. 3, the coupling mechanism 312 couples the panel 322 to the eyewear device 310 to position the panel 322 in an area of the second lens 326. Examples of the coupling mechanism 312 can include snap-op mechanisms, clamp mechanisms, magnetic fasteners, etc.

In some examples, the coupling mechanism 312 can enable the panel 322 to be fixed in orientation or to be physically manipulatable in orientation. For example, the panel 322 can be manipulatable into and out of an area of the first lens 336 by a variety of mechanisms (e.g., jointed assembly, hinge mechanism, sliding mechanism, etc.). The example of FIG. 3 shows a fixed panel. The example of FIGS. 4A through 4B, discussed below, show a physically manipulatable panel.

Figure 4A:
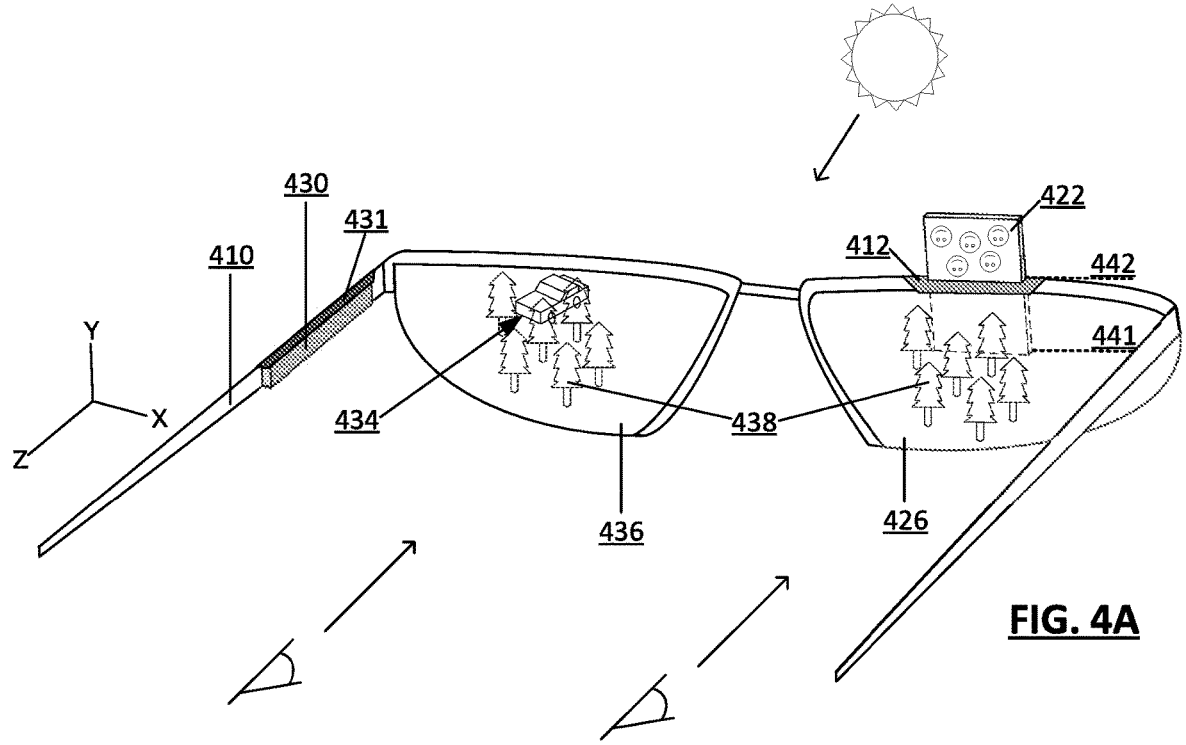
FIG. 4A illustrates an example electronic eyewear assembly with a panel in a first position.
Figure 4B:
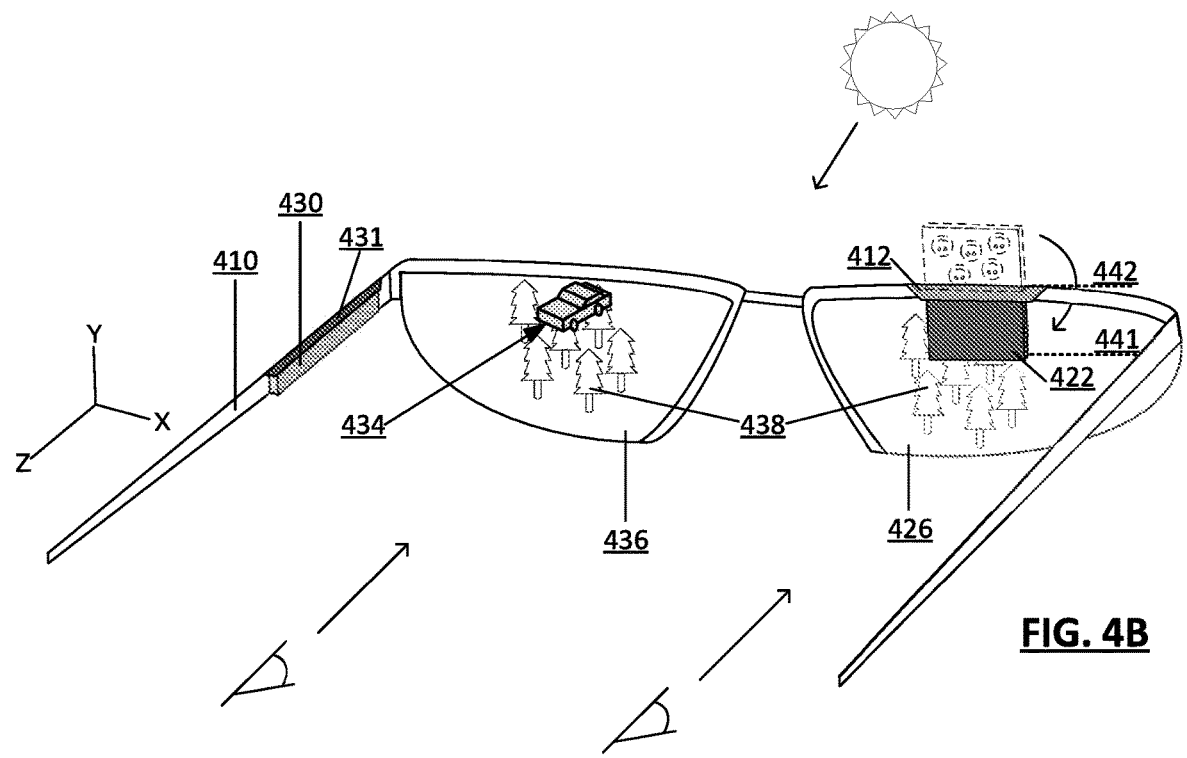
FIG. 4B illustrates an example electronic eyewear device with a panel in a second position.

FIGS. 4A through 4B illustrate an example of the electronic eyewear assembly of FIG. 3. The example eyewear assembly of FIG. 3 illustrates a panel 322 with a fixed orientation. FIGS. 4A through 4B illustrate a panel 422 that is physically manipulatable in orientation. In addition, the effect of the panel in FIGS. 4A through 4B is illustrative of the effect of the panel in FIG. 1, FIGS. 2A through 2C and FIG. 3 in terms of enhancing a visual quality and discernibility of an output or of content when overlaid on a surrounding environment.

In the example of FIG. 4A, the eyewear device 410 includes a first lens 436 and a second lens 426. The display component 430 is coupled to the eyewear device 410 via the display component coupling mechanism 431. The display component 430 generates display content 434 on an interior of the first lens 436. In the examples of FIGS. 4A through 4B, the display content 434 represents a digital image of a car.

From the perspective of the user's perception, the display content 434 may appear to be overlaid or superimposed on a surrounding environment 438. In the examples of FIGS. 4A and 4B, the surrounding environment 438 includes a grouping of trees.

In further reference to FIG. 4A, the panel 422 is coupled to the eyewear device 410 via the panel coupling mechanism 412. In the examples of FIGS. 4A and 4B, the panel coupling mechanism 412 includes a pivot point or hinging mechanism (not shown) to enable the panel to swing out along the Z axes and up/down along the Y axes. In FIG. 4A, the panel 422 is in panel position 442. In panel position 442, the panel 422 is not positioned to attenuate light directed through an exterior of an area of the second lens 426.

In FIG. 4B, the hinging mechanism enables the panel 422 to swing out along the Z axes and down along the Y axes to panel position 441. In panel position 441, the panel 422 is positioned in an area of the second lens 426 to attenuate light directed through an exterior of the second lens 426. In this orientation, when the user views the surrounding environment 438 through the first lens 436, the display content 434 the overlaid onto the surrounding environment. However, the surrounding environment 438 is not as perceptible to the user viewing through the second lens 426, because of the panel 422. In this way, the attenuation of light through the second lens 426 increases the ability of the user to discern between the display content 434 and the surrounding environment 438 when viewed by a first eye of the user through an area of the first lens 436.

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature. Thus, the absence of describing combinations should not preclude having rights to such combinations.

What is claimed is:

1. An electronic eyewear device comprising:
   a structure including a frame that defines a display lens area and a free lens area, the structure being wearable to position the display lens area across from a first eye of a user and the free lens area across from a second eye of the user;

a display assembly including a display surface provided in the display lens area; and a panel to attenuate light provided in the free lens area, wherein a position of the panel with respect to the free lens area matches a position of the display surface with respect to the display lens area.

2. The electronic eyewear device of claim 1, wherein the display assembly renders an output including an image on the display surface that appears superimposed on a surrounding environment of the first eye.

3. The electronic eyewear device of claim 1, wherein an interior façade of the panel that directly opposes the second eye is opaque.

4. The electronic eyewear device of claim 3, wherein an exterior façade of the panel includes a visual design different from the interior façade of the panel.

5. The electronic eyewear device of claim 1, wherein the panel includes a material that changes opacity in response to an input.

6. The electronic eyewear device of claim 5, wherein the material is electrochromic.

7. The electronic eyewear device of claim 1, wherein the panel is physically manipulatable in orientation.

8. The electronic eyewear device of claim 1, wherein the panel obscures of a same portion of a field of view of the second eye of the user that is viewed through the display surface by the first eye of the user.

9. The electronic eyewear device of claim 1, wherein a size of the panel matches a size of the display surface.

10. The electronic eyewear device of claim 9, wherein both the panel and the display surface occupy only a portion and less than all of the free lens area and display lens area, respectively.

11. The electronic eyewear device of claim 1, wherein the panel is attached to the frame by a pivot, hinge or slider to allow the panel to move into and out of position in the free lens area.

12. An accessory device for an electronic eyewear device, the electronic eyewear device comprising a display device to be positioned in front of first eye to display an image that then appears superimposed on a field of view as partially seen through the display device, the accessory device comprising:

a panel formed of material to attenuate light; and a coupling mechanism to couple the panel to a structure of the electronic eyewear device to position the panel in a lens area of the structure corresponding to a second eye, the panel to attenuate light from a same area of the field of view over which the displayed image is superimposed.

13. The accessory device of claim 12, wherein an interior façade of the panel is opaque.

14. The accessory device of claim 13, wherein an exterior façade of the panel includes a visual design different from the interior façade of the panel.

15. The accessory device of claim 12, wherein the panel includes a material that changes opacity in response to an input.

16. The accessory device of claim 15, wherein the material is electrochromic.

17. The accessory device of claim 12, wherein the panel is physically manipulatable in orientation relative to the lens area of the structure.

18. The accessory device of claim 12, wherein the panel can be integrated with an eyeglass of the structure.

19. The accessory device of claim 12, wherein the coupling mechanism is a snap, clamp or magnetic coupling mechanism.

20. An electronic eyewear assembly, the electronic eyewear assembly comprising:

an eyewear device including a first lens and a second lens;

a display component coupled to the eyewear device to generate display content on a display surface positioned on an interior of the first lens; and a panel coupled to the eyewear device to attenuate light directed through an exterior of the second lens, the panel corresponding to the display surface in size and in position relative to each respective lens.

* * * * *